UNITED STATES PATENT OFFICE.

EDWARD STANLEY BOYNTON, OF BRIDGEPORT, CONNECTICUT, ASSIGNOR TO SOLOMON J. GORDON, OF NEW YORK, N. Y.

PROCESS OF COLORING AND HARDENING ARTICLES MANUFACTURED OF CLAY.

SPECIFICATION forming part of Letters Patent No. 287,799, dated November 6, 1883.

Application filed September 26, 1883. (No specimens.)

*To all whom it may concern:*

Be it known that I, EDWARD STANLEY BOYNTON, of Bridgeport, county of Fairfield, State of Connecticut, have invented a new and useful Improvement in Processes for Coloring and Hardening Articles Manufactured of Clay, which is fully set forth in the following specification.

My discovery is an improvement on the processes patented in the United States to Jacob Ambuhl, August 3, 1880, and March 27, 1883; and it consists in removing all moisture from the clay previous to the addition of the coloring and hardening solution.

The object of my invention is to color articles manufactured of clay, when the color is produced by the addition of chemicals, so that the entire product shall be of equal and uniform color.

By previous processes it was customary to add the coloring and hardening solutions to the clays when in a moist condition, and when the coloring material added was of a neutral or the same character as the moisture already in the clay the clay would not readily receive it, and when the clay was subjected to pressure in molding the coloring addition was liable to be driven to the surface, leaving the interior of the product deficient in color.

In practice my method is as follows: For any given amount of clay in a dry state I add the usual percentage of coloring and hardening material, which has been previously mixed with water of a sufficient quantity to temper the clay to a consistency for molding, when the whole mass is mixed and worked in the usual manner. Very superior results are obtained when the clay is again dried and ground, after the addition of the coloring and hardening-material, as the oxidation then becomes more complete, which is very desirable in using the finer products of clay; but for the larger and coarser products, when sand is present, this will not be necessary to produce satisfactory results.

What I claim, and desire to secure by Letters Patent, is—

The process herein described of coloring and hardening articles manufactured from clay, when the clay is dried previous to the addition of coloring and hardening material.

EDWARD STANLEY BOYNTON.

Witnesses:
JOHN W. RIPLEY,
OSCAR MATHER.